United States Patent

Guggi

[15] 3,671,845
[45] June 20, 1972

[54] STABILIZED SINE WAVE INVERTER

[72] Inventor: Walter Bernhard Guggi, Im Boden 265, CH-8172, Niederglatt, Switzerland

[22] Filed: July 19, 1971

[21] Appl. No.: 163,801

[30] Foreign Application Priority Data

July 23, 1970    Switzerland .......................... 11309/70

[52] U.S. Cl. ............................... 321/20, 321/45, 321/45 ER
[51] Int. Cl. ....................................................... H02m 1/08
[58] Field of Search ............................. 321/20, 21, 45, 45 C

[56] References Cited

UNITED STATES PATENTS

| | | | |
|---|---|---|---|
| 2,239,437 | 4/1941 | Bedford | 321/36 |
| 2,959,726 | 11/1960 | Jensen | 323/43.5 S X |
| 3,350,620 | 10/1967 | Barron | 323/43.5 S X |
| 3,384,803 | 5/1968 | Hardin et al. | 323/43.5 S X |
| 3,413,539 | 11/1968 | Lopitzsch | 321/45 R |
| 3,449,655 | 6/1969 | Jager | 321/45 R X |

FOREIGN PATENTS OR APPLICATIONS 1,304,263    8/1962    France .................................... 321/20

Primary Examiner—William M. Shoop, Jr.
Attorney—John J. McGlew et al.

[57] ABSTRACT

A stabilized inverter transforms direct current into sine-like alternating current by means of SCR current valves operating in conjunction with a tuned LC circuit. Chopped direct current, with alternating polarities, is applied across the primary winding of a transformer which has a commutating capacitor connected in parallel therewith. One terminal of a source of DC potential is connected to the center tap of the primary winding in series with a capacitor serving to separate alternating current and direct current. This source terminal is further connected, through an inductor, in parallel to the anodes of two SCR valves whose cathodes are connected to respective taps spaced symmetrically to either side of the center tap of the transformer primary winding. These two SCR valves are triggered by a phase control circuit connected to the transformer output to apply, to the capacitor connected in series with the DC source, either a positive or a negative charge, of variable magnitude, depending on the setting of the phase control circuit. This capacitor charge is either added to or subtracted from the direct current input voltage in accordance with the status of the latter.

6 Claims, 1 Drawing Figure

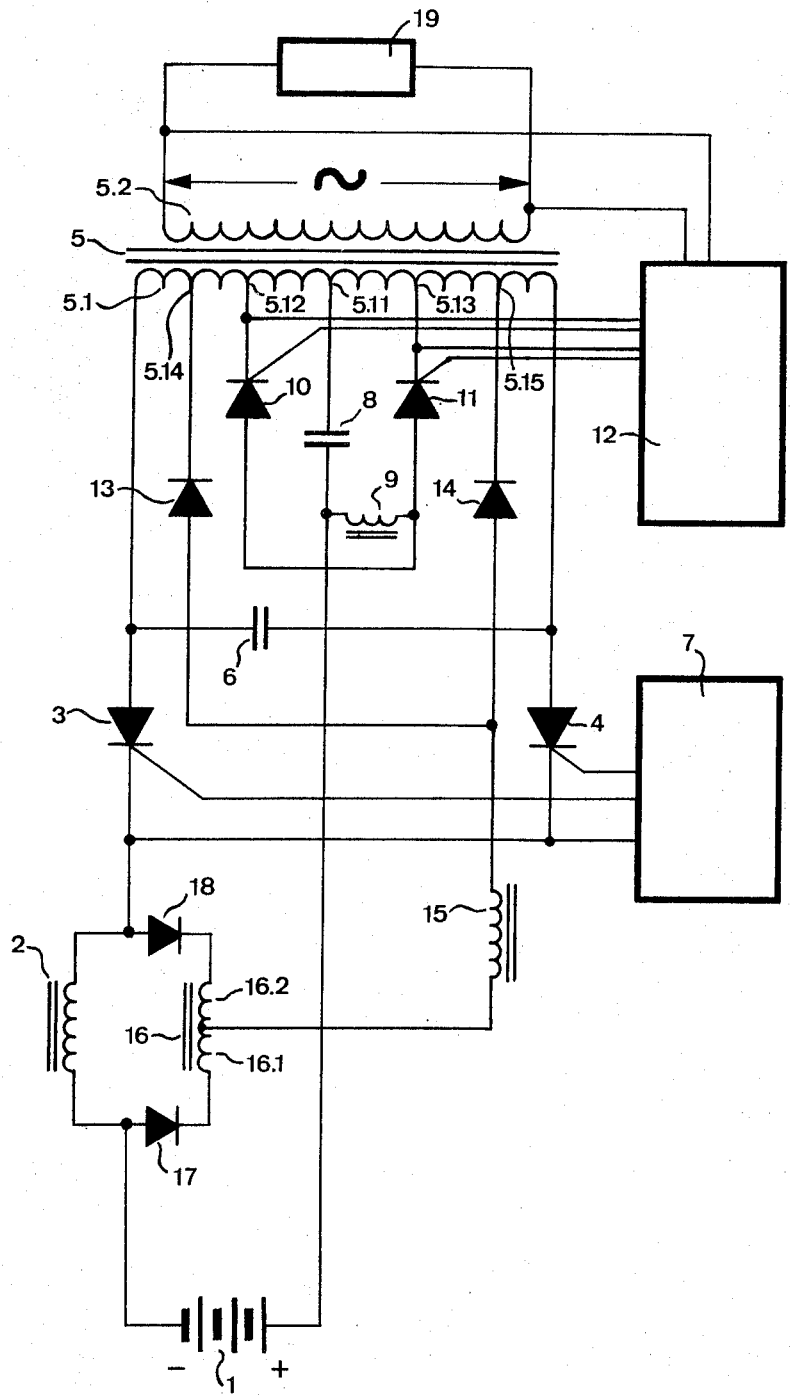

3,671,845

STABILIZED SINE WAVE INVERTER

FIELD OF THE INVENTION

This invention relates to stabilized sine wave inverters and, more particularly, to such an inverter provided with an improved, highly efficient and highly reliable control system which does not require excessive over-dimensioning of the inverter.

BACKGROUND OF THE PRIOR ART

U.S. Patent Application Ser. No. 24,007, filed Mar. 30, 1970, for "STABILIZED SINE WAVE INVERTER," now U.S. Pat. No. 3,605,003, issued Sept. 14, 1971, is directed to a stabilized inverter apparatus capable of transforming direct current into alternating current, particularly sine-like alternating current, by means of trigger controlled current valves, such as SCR valves, in conjunction with a tuned electrical LC circuit, by feeding direct current from a source thereof through a tuning inductor and current valves. Chopped direct current, with alternating polarities, is applied across the terminals of the primary winding of an inverter transformer having a capacitor connected in parallel therewith, so that energy may be drawn from the transformer by connecting a load to any suitable winding thereof. The arrangement includes stabilizing means for the output level which involve controlled energy feedback to the direct current input side from the transformer through rectifiers using at least two feedback paths. These paths are electrically separated but are magnetically coupled.

An essential advantage of this inverter principle lies in its ability of being provided with simple output voltage control means. As disclosed in the mentioned patent application, this is accomplished by means of a voltage tap on the inverter transformer leading to a controlled rectifying circuit whose output is connected in series with the direct current source, thus providing means for adding a controlled potential to the potential of this source. The value can be regulated by means of trigger controlled current valves.

In the circuit illustrated in FIG. 3 of the mentioned application, energy feedback is provided by means of a secondary winding on the inverter output transformer, the energy feedback leading back to the direct current source. A variable potential is added to the supply source by means of a capacitor, with the amount of return energy being controlled by trigger phase adjustment of controlled current valves. Thereby, feedback energy, derived from the output side of the inverter and which is returned to the input side, recirculates within the inverter system. This is a disadvantage, as the dimensioning of the inverter has to be increased in order to handle the additional increased circulating energy. In turn, this leads to a decrease in the efficiency of inversion or of transformation of direct current into alternating current.

SUMMARY OF THE INVENTION

The objective of the present invention is to provide an inverter, as disclosed in the above-mentioned patent application, with an improved, highly efficient, highly reliable type control system which does not require eccessive over-dimensioning of the inverter and which, in addition, provides fast regulating action and low distortion of the output wave-shape. The regulation furthermore is electronically controlled, and is particularly suitable for power ranges commonly used in inverter applications.

In accordance with the invention, this problem is solved by tapping the appropriate winding of the inverter output transformer, and by returning rectified alternating current, through a smoothing inductor, to that terminal or pole of the direct current source which is connected to the center tap of the transformer. A capacitor is connected between this pole of the direct current source and the center tap, to separate the input current to the inverter into AC and DC components. The feedback current is rectified and controlled by means of trigger-controlled current valves, and the capacitor passes the AC component of the input current with the controlled current valves passing the DC component. The value and polarity of this DC component is adjusted as a function of the phase angle setting of the controlled current valves. This provides continuous adjustment of the magnitude as well as at the polarity of the potential build-up, or charge, upon the capacitor, which, in turn, provides voltage addition or voltage subtraction to the DC input voltage. In turn, this varies the inverter output voltage accordingly.

An object of the invention is to provide an improved stabilized sine wave inverter.

Another object of the invention is to provide such a stabilized sine wave inverter having an improved, highly efficient and highly reliable control system which does not require excessive over-dimensioning of the inverter.

A further object of the invention is to provide such a stabilized sine wave inverter in which the control system provides fast regulating action and low distortion of the output wave shape.

For an understanding of the principles of the invention, reference is made to the following description of a typical embodiment thereof as illustrated in the accompanying drawing.

BRIEF DESCRIPTION OF THE DRAWING

In the drawing, the single FIGURE is a schematic wiring diagram of a stabilized sine wave inverter embodying the invention.

DESCRIPTION OF THE PREFERRED EMBODIMENT

Referring to the drawing, the negative terminal of a source of DC potential 1 is connected to one terminal of a tuning inductor 2 whose other terminal is connected, in parallel, to the cathodes of SCRs 3 and 4. The respective anodes of SCRs 3 and 4 are connected to the end terminals of the primary winding 5.1 of inverter transformer 5, and also to the terminals of a commutating capacitor 6. The trigger electrodes of SCRs 3 and 4 are connected to a pulse generator 7 which is also connected to the cathodes of these SCRs.

The positive terminal or pole of DC source 1 is connected to one terminal of a capacitor 8 whose other terminal is connected to the center tap 5.11 of transformer 5, and the positive pole of source 1 is also connected to one terminal of inductor 9. The other terminal of inductor 9 is connected in parallel to the anodes of SCRs 10 and 11, whose cathodes are connected to respective taps 5.12 and 5.13 which are located symmetrically with respect to center tap 5.11 of primary winding 5.1 of transformer 5.

The trigger electrodes of SCRs 10 and 11 are connected to a phase control trigger circuit 12 which is also connected to the cathodes of SCRs 10 and 11. The cathodes of a pair of diodes 13 and 14 are connected to respective taps 5.14 and 5.15 which are symmetrically located, with respect to center tap 5.11 of primary winding 5.1 of transformer 5. The anodes of diodes 13 and 14 are commonly connected to one terminal of an inductor 15 whose opposite terminal is connected to the center tap of a differential inductor 16, formed by windings 16.1 and 16.2, and whose opposite polarity terminals are connected to the cathodes of diodes 17 and 18 respectively. Each diode 17 and 18 is connected to a respective terminal of tuning inductor 2.

Direct current, derived from source 1, is commutated, by conventional methods, between SCRs 3 and 4 with the aid of commutating capacitor 6, and is made available to the user across secondary winding 5.2 of transformer 5. By the resonance effect of inductor 2, together with the commutating capacitor 6, which two components are connected alternately through different halves of the primary winding of transformer 5, a sine-like alternating current is generated across the output terminals of the inverter.

The inverter system is well stabilized by means of energy feedback originating from taps 5.14 and 5.15 of primary winding 5.1, and returned over two electrically separated paths which are magnetically coupled. These paths comprise diodes 13 and 14, inductor 15, windings 16.1 and 16.2 of differential inductor 16 and diodes 17 and 18. The output voltage across the secondary winding thereby remains practically independent of load changes, and varies in proportion to the magnitude of the applied input voltage.

In order to compensate automatically for voltage changes of direct current source 1 in addition to the sum of the voltage drops within the inverter system, energy feedback or energy control is provided by means of the phase controlled rectifiers connected to taps 5.12 and 5.13 of primary winding 5.1, and feeding rectified alternating current back, or controlling energy flow, to capacitor 8 which is connected to the center tap of transformer winding 5.1. Capacitor 8, conjointly with inductor 9, has the purpose of separating AC and DC components, whereby the DC component is controlled by the phase angle position of the trigger setting of SCRs 10 and 11. This provides a controlled charge upon capacitor 8, which charge is in additive polarity with respect to DC source 1, for early trigger settings, or in subtractive polarity with respect to DC source 1, for late trigger settings. As, in this system, the inverter output voltage is proportional to the DC input voltage, it is evident that the output voltage is also proportional to the sum or the difference of the input voltage and the capacitor charge, so that output voltage regulation takes place as a function of the trigger setting effective upon SCRs 10 and 11. It will be noted that the phase control trigger circuit 12 is connected to the output of the inverter system which is indicated as having a load 19 connected thereacross.

Normally, the inverter system is so designed as to operate in the subtractive mode for high efficiency, while the additive mode is used for short time intervals only. However, this is not mandatory for proper functioning. The phase control system does not necessarily have to be controlled by the inverter output voltage only, as independent control functions are possible to meet special requirements.

While a specific embodiment of the invention has been shown and described in detail to illustrate the application of the principles of the invention, it will be understood that the invention may be embodied otherwise without departing from such principles.

What is claimed is:

1. A stabilized inverter apparatus, capable of transforming direct current into alternating current, and particularly sine-like alternating current, by means of trigger controlled current valves in conjunction with a tuned electrical LC circuit, by feeding direct current from a source thereof through a tuning inductor and current valves, applying chopped direct current with alternating polarities across the terminals of the primary winding of the transformer which primary winding has a capacitor connected in parallel therewith, whereby energy may be drawn from said transformer by connecting a load to a winding thereof, and stabilizing means stabilizing the output level by controlled energy feedback to the direct current input from said transformer through rectifiers, said inverter apparatus comprising, in combination, an input connection between one terminal of said DC source and the center tap of a winding of the inverter transformer; energy flow means connected between taps on said winding on opposite sides of said center tap and said connection; said energy flow means comprising respective phase controlled current valves and feeding controlled rectified DC current to said connection; a second capacitor in said connection effecting separation of AC and DC components in said input connection; and a phase angle control connected to said phase controlled current valves and operable to effect application of a variable magnitude charge, of a selected polarity, to said second capacitor in accordance with the setting of said control; said charge being either added to or subtracted from the DC input potential in accordance with the status of the latter.

2. A stabilized inverter apparatus, as claimed in claim 1, in which said energy flow means comprises energy feedback means.

3. A stabilized inverter apparatus, as claimed in claim 1, in which said energy flow means comprises energy flow control means.

4. A stabilized inverter apparatus, as claimed in claim 1, including an inductor connected to said one terminal of said DC source and in parallel to said phase controlled current valves.

5. A stabilized inverter apparatus, as claimed in claim 1, in which said phase controlled valves comprise SCRs having trigger electrodes; said phase angle control being connected to the output of said inverter apparatus and to the trigger electrodes and cathodes of said SCRs.

6. A stabilized inverter apparatus, as claimed in claim 5, including a junction point connected to said one terminal of said DC source; said second capacitor being connected between said junction point and the center tap of said winding of the inverter transformer; and an inductor having one terminal connected to said junction point and its opposite terminal connected in parallel to the anodes of said SCRs.

* * * * *